United States Patent [19]

Gaidis et al.

[11] Patent Number: 5,132,183
[45] Date of Patent: Jul. 21, 1992

[54] COMPOSITIONS AND METHODS FOR WATERPROOFING STRUCTURES FORMED FROM WATER-PENETRABEL CONSTRUCTION MATERIALS

[75] Inventors: James M. Gaidis, Ellicott City, Md.; Robert A. Wiercinski, Somerville, Mass.

[73] Assignee: W. R. Grace & Co.-Conn., New York, N.Y.

[21] Appl. No.: 730,583

[22] Filed: Jul. 15, 1991

Related U.S. Application Data

[63] Continuation of Ser. No. 368,640, Jun. 20, 1989, abandoned.

[51] Int. Cl.$^5$ .................. B32B 11/00; B32B 11/04; C09J 3/30
[52] U.S. Cl. .................. 428/489; 52/309.12; 156/71; 156/280; 156/337; 428/492
[58] Field of Search .......... 428/489, 40, 492; 156/337, 280, 71; 52/309.8, 309.12; 524/35, 60; 83/461

[56] References Cited

U.S. PATENT DOCUMENTS

| | | | |
|---|---|---|---|
| 3,741,856 | 6/1973 | Hurst | 428/489 X |
| 3,853,682 | 12/1974 | Hurst | 156/337 |
| 3,900,102 | 8/1975 | Hurst | 156/71 |
| 3,940,540 | 2/1976 | Schmidt | 428/489 X |
| 4,104,211 | 8/1978 | Keene | 524/35 |
| 4,151,025 | 4/1979 | Jacobs | 156/71 |
| 4,172,830 | 10/1979 | Rosenberg | 428/489 X |
| 4,176,102 | 11/1979 | Favata | 524/60 |
| 4,362,586 | 12/1982 | Uffner | 156/71 |
| 4,544,690 | 10/1985 | Ladish | 404/31 X |
| 4,597,817 | 7/1986 | Larsen | 156/280 |
| 4,600,657 | 7/1986 | Wegehaupt | 428/489 X |
| 4,619,166 | 10/1986 | Valavaara | 83/461 |
| 4,649,166 | 3/1987 | De Fatis | 524/35 |
| 4,707,961 | 11/1987 | Nunley | 52/309.8 |
| 4,731,399 | 3/1988 | Fitzgerald | 428/489 X |
| 4,774,115 | 9/1988 | Ruehl | 428/489 X |
| 4,775,567 | 10/1988 | Harkness | 428/40 |
| 4,789,578 | 12/1988 | Twyford | 428/40 |

*Primary Examiner*—Thomas J. Herbert, Jr.
*Attorney, Agent, or Firm*—William L. Baker; Craig K. Leon

[57] ABSTRACT

Method of reducing waterpenetration through civil engineering structures which comprise applying to the structures a waterproofing agent pretreatment composition including SBR latex, SBS latex, natural rubber latex, polybutadiene latex, polychloroprene latex, or combinations thereof and packages including the latex-containing waterproofing agent pretreatment compositions and waterproofing agents, and structures to which have been applied the latex-containing waterproofing agent pretreatment compositions.

21 Claims, No Drawings ent application is a continuation of application Ser. No. 07/368,640, filed on Jun. 20, 1989, now abandoned.

COMPOSITIONS AND METHODS FOR WATERPROOFING STRUCTURES FORMED FROM WATER-PENETRABEL CONSTRUCTION MATERIALS

The present application is a continuation of application Ser. No. 07/368,640, filed on Jun. 20, 1989, now abandoned.

BACKGROUND OF THE INVENTION

1. Field of the Invention

The present invention relates to compositions and methods useful for waterproofing or dampproofing various water-penetrable materials used in building construction and other civil engineering projects. Specifically, the methods use new aqueous pretreatment compositions which include certain polymer latices, packages including waterproofing agents and new pretreatment compositions, and structures to which has been attached a new pretreatment and a waterproofing agent.

2. Description of Related Art

Various materials used in building construction and other civil engineering projects such as roads and bridges are susceptible to water penetration resulting either from their inherent properties or imperfections such as cracks or pores. Reducing or eliminating water penetration through structures formed of these materials often is desirable such as for below-grade building walls, and may be critical in certain structures such as those housing expensive electrical equipment or tunnels moving vehicular or pedestrian traffic under bodies of water. Available waterproofing agents include ethylene propylene diene monomer (EPDM) sheets, polyvinyl chloride sheets, Bentonite panels, built-up asphalt systems, coal tar-based, and other asphalt-based compositions. Asphalt-based compositions are preferred; most preferred are preformed, flexible sheet-like laminates of support film(s) and bituminous layer(s) (waterproofing laminates) such as described in U.S. Pat. Nos. 3,741,856; 3,853,682; and 3,900,102. Bituthene® brand of waterproofing membrane is an example of preferred, commercially available asphalt-based waterproofing agents.

Many currently available waterproofing agents are very effective when applied correctly. For example, when using waterproofing laminates as a waterproofing agent current practice requires that a pretreatment be applied to the structure before application of the waterproofing laminate. Most available pretreatments are based upon volatile organic compounds and usually contain high levels of these compounds as solvents. Known aqueous pretreatments, such as asphalt emulsions have not been used widely because of poor water immersion resistance and freeze/thaw resistance. Consequently, use of available pretreatments is fraught with disadvantages including the need to exercise great care to avoid fire hazard and atmospheric release of volatile organic compounds, or risk of failure resulting from poor water immersion resistance.

Therefore, despite use of waterproofing agents that require pretreatment, such as waterproofing laminates, for many years there has been and remains a need for pretreatment compositions which eliminate use of volatile organic compounds without sacrificing the strength and duration of the bond between the waterproofing agent and structure.

U.S. Pat. No. 3,940,540 to Schmidt teaches built-up roofing employing precoated felts inhibited from slipping by use of bituminous emulsions to bind the felts. A minor amount of compatible latex is incorporated into the emulsion to increase the adhesion of bonded felts.

U.S. Pat. No. 4,172,830 to Rosenberg et al. is one of many examples of references disclosing sheet-like flexible materials used for waterproofing.

U.S. Pat. No. 4,362,586 to Uffner et al. describes use of polyamide resins as primers for highway repairs using asphaltic membranes.

U.S. Pat. No. 4,731,399 discloses extending certain latices by addition of up to about 40% by weight of an emulsion of asphalt, bitumen, or coal tar. The extended latices are said to be useful in adhering scrim to carpet or in manufacture of attached foamed carpet backing.

U.S. Pat. No. 4,597,817 to Larsen describes processes for preparation of water-impervious surface coating on a substrate which comprises applying to the substrate an aqueous bitumen emulsion containing, in part, 5–55% by weight of an acrylic prepolymer.

U.S. Pat. No. 4,544,690 to Ladish discloses an aqueous rubberized coal tar emulsion composition suitable for coating and sealing bituminous substrates containing asphalt in which the coal tar emulsion includes water admixed with a small amount of carboxylated butadiene/styrene/acid copolymer latex having a particular particle size.

U.S. Pat. No. 4,104,211 to Keene et al. describes pipe sealants made from an aqueous emulsion of non-cationic asphalt and rubber.

U.S. Pat. No. 4,176,102 to Favata teaches sealant asphaltic emulsion ceilings having 20–50 parts by volume of a copolymer prepared by copolymerization of a vinyl acetate monomer with an organic acid.

U.S. Pat. No. 4,619,166 to DeFatis teaches a mortar for waterproofing and protective coverings used in building and road construction wherein the mortar includes a mixture of an acrylic emulsion and finely ground clay which has been baked at a temperature range between 600° C. and 1,400° C.

U.S. Pat. No. 4,151,025 to Jacobs describes use of volatile organic solvent-based primers with laminated waterproofing membranes.

SUMMARY OF THE INVENTION

The present invention relates to methods useful for attaching waterproofing agents to water-penetrable constructions materials, compositions useful in these methods, and structures resulting from use of these methods. More specifically, the present invention relates to using compositions including styrene-butadiene rubber latex, styrene-butadiene-styrene rubber latex, natural rubber latex, polybutadiene latex, and/or polychloroprene latex in application of waterproofing agents to buildings and other civil engineering structures.

DETAILED DESCRIPTION OF THE INVENTION

Optimal waterproofing of structures such as buildings, bridges, roads, and tunnels requires bonds between the structure and waterproofing agent which endure essentially for the life of the structure. These enduring bonds even are important in applications such as subterranean basements, where the backfill holds the waterproofing agent in place, to prevent migration along the surface of the structure of water which may enter through damaged areas of the waterproofing agent. To achieve enduring bonds between structures and asphalt or coal tar-based waterproofing agents, pretreatments usually are applied prior to application of the waterproofing agent. All the waterproofing agent pretreatments in current widespread use have high levels of volatile organic compounds, usually as solvents, and thus present potential fire hazards and sources of atmospheric release of volatile organic compounds.

The present invention resides in the discovery that when used as waterproofing agent pretreatments aqueous mixtures of styrene-butadiene rubber (SBR), styrene-butadiene-styrene rubber (SBS), natural rubber polybutadiene, and/or polychloroprene facilitate formation of strong and enduring bonds between waterproofing agents and the structure to which they are applied. The latices used in the aqueous based pretreatments of the invented methods have the following characteristics:

Preferred SBR latices include styrene:butadiene polymers having styrene:butadiene ratios of from 1:99 to 60:40, more preferred are SBR latices having styrene:butadiene ratios of from about 20:80 to about 40:60. Stabilizers such as fatty acid surfactants or mixed acid surfactants are necessary ingredients in these latices.

Preferred SBS latices include styrene:butadiene polymers of number average molecular weights from about 50,000 to 500,000 having styrene:butadiene ratios of from about 10:90 to 40:60. Components in these latices include cationic, anionic, or nonionic surfactants and, optionally, tackifiers such as rosin esters. Preferred natural rubber and polybutadiene latices have a minimum weight average molecular weight of 50,000 and may contain some gel.

Generally, any SBR latex, SBS latex, natural rubber latex, polybutadiene latex, or polychloroprene latex which, when used as a waterproofing agent pretreatment, provides bonds sufficiently strong and enduring to secure the waterproofing agent to the structure essentially for the life of the structure are used in this invention. Persons skilled in the art readily are able to select from SBR, SBS, natural rubber, and polybutadiene latices those which are operable in this invention. The Example 18 Slow Peel Test procedure is an example of a test representing an important performance criterion and is used to determine whether latices can be used as waterproofing agent pretreatments.

The aqueous pretreatments used in the invented methods include one or more of the above latices in 1-70% by weight of solids, preferably 3-35% by weight of solids. Optional ingredients in these primers include tackifiers such as emulsions of rosin esters of emulsions of hydrocarbon resins; freeze/thaw agents such as ethylene glycol or propylene glycol; antifungicides such as formaldehyde, oxazolidine-heterocyclic amine, 2-[(hydroxymethyl)amino]ethanol, or benzisothiazolin-3-one; thickeners such as cellulosic polymers, polyacrylic acid, or associative urethane; and cationic, or anionic, or nonionic surfactants. Asphalt emulsions, preferably in amounts of about 5 to about 20%, also are optional ingredients in the invented pretreatments. To help prevent mold, mildew growth and rust formation, if stored in ferrous metal containers, the pH of the invented pretreatments optionally is adjusted to about 8 to 9 by, for example, addition of ammonium hydroxide.

As used in the specification and claims a waterproofing agent pretreatment(s) is a composition used as a surface conditioner or a composition used as a primer.

A surface conditioner composition is applied to a structure surface to adhere dust and other contaminants to the surface thereby enhancing the mechanical integrity of the surface. Primers are compositions applied to structure surfaces which may perform the functions of surface conditioners. In addition primers also promote good initial adhesion of the waterproofing agent by filling in voids in microscopically rough structure surfaces thereby providing a smoother surface that is more receptive for bonding. Because of this characteristic the preferred waterproofing agent, a pressure sensitive adhesive waterproofing laminate, need not be as deformable to make good contact with a primed surface as would be the case for a conditioned surface. Also a primer layer because of its greater thickness than a conditioner layer is tacky. Tackiness also aids in promoting good initial adhesion. Primer compositions generally have a higher solids content than surface conditioner compositions.

In the invented methods, waterproofing materials based on coal tar or asphalt are used, asphalt-based waterproofing materials are preferred. Especially preferred are waterproofing materials constructed of preformed, flexible sheet-like laminates of support films and bituminous layers which shall be referred as waterproofing laminates. Various waterproofing laminates are commercially available. Bituthene® brand waterproofing membranes are preferred commercially available waterproofing laminates.

Various civil engineering structures including, for example, buildings, bridges, roads, and tunnels, are made waterproofing using the present invention. As used herein, making a structure "waterproof" means reducing or eliminating the ability of water to penetrate the structure. The present invention is used to make waterproof structures constructed of materials which are water-penetrable either inherently or as a result of imperfections such as cracks or pores. The types of water-penetrable construction materials with which the present invention is used include wood, brick, stone, blended cements, pozzolanic cements, or concrete, preferably Portland cement concrete.

According to the presently invented method for reducing water penetration through a structure, initially a pretreatment including one or more of the above latices is applied to a structure and allowed to dry. Thereafter, a waterproofing agent is affixed to the pretreatment-coated structure surface. Using the invented method, the pretreatment preferably is applied to a structure surface at a coverage rate of about 100-1200 sq. ft./gal., preferably about 100-500 sq. ft./gal. when used as a primer and 500-1,200 sq. ft./gal. when used as a surface conditioner. Other suitable coverage rates and film thicknesses are readily determined by persons skilled in the art.

Waterproofing laminates are the preferred waterproofing agents for use in the invented methods. Preferred waterproofing laminates have a bituminous layer comprised of about 29-60% by weight asphalt, about 25-55% by weight process oil, about 10-35%, preferably 16-35% by weight of a thermoplastic block polymer of styrene and butadiene monomers or random styrene and butadiene rubber polymers. As used herein, the weight percent of asphalt, process oil, and thermoplastic block polymer of butadiene and styrene is calculated based on the total of these components not including fillers, which may be included in amounts of 1-50%, preferably 10-20%, by weight of the total weight of asphalt, process oil, thermoplastic block polymer of butadiene and styrene, and filler, or any other components.

In more preferred waterproofing laminates the asphalt used has the following alumina separation (ASTM D4124) ranges and preferred ranges:

|  | Range | Preferred Range |
|---|---|---|
| Saturates | 5-25% | 8-15% |
| Naphthenic Aromatics | 15-40% | 32-40% |
| Polar Aromatics | 30-50% | 40-46% |
| Asphaltenes | 5-30% | 8-15% |

Also, in the preferred waterproofing laminates the preferred process oil for use in the bituminous layer has the following clay gel separation (ASTM D-2007) ranges:

| Saturates | 10-30% |
|---|---|
| Polar Compounds | 10-20% |
| Aromatics | 50-85% |
| Asphaltenes | 0-0.5% |

Additionally, in the preferred waterproofing laminates preferred thermoplastic block polymers of styrene and butadiene monomers are mixtures of polymers having a butadiene:styrene ratio of about 70:30 and a block polystyrene content of about 30% (high molecular weight polymer) and polymers having a butadiene:styrene ratio of about 75:25 and a block polystyrene content of about 18% (low molecular weight polymer). More preferred are polymers in which the ratio of the low molecular weight polymer to the high molecular weight polymer is in the range of 5:1 to 1:1; most preferred are polymers wherein the ratio of low molecular weight polymer to high molecular weight polymer is about 3.8:1 or 2:1. In the preferred waterproofing laminates including random styrene and butadiene rubber polymers, the preferred styrene:butadiene ratio is in the range of 1:99 to 35:65, the most preferred range is 15:85 to 28:72.

In another aspect the present invention is a package including an aqueous-based pretreatment including one or more of the above latices and a waterproofing laminate used in the presently invented methods. The invention also includes a structure to which has been attached a presently invented latex pretreatment and a coal tar or asphalt-base waterproofing agent used in the invented methods.

Contemplated equivalents of the present invention include methods for reducing water penetration through a structure that comprise using other aqueous pretreatments which include latices that are compatible with the waterproofing agent with which they are used and that produce strong and enduring bonds between waterproofing laminates and the structure to which they are applied.

The following examples provide specific illustrations of the invention, but are not intended to limit the scope of the invention as described above and claimed below.

EXAMPLE 1

SBR Latex Pretreatment

A waterproofing agent pretreatment composition was prepared from Butonal NS 175 ® (BASF), an SBR latex including a styrene:butadiene polymer having a styrene:butadiene ratio of 24:76 and fatty acid as a surfactant. This SBR latex (36.2% w/w) and water (63.8% w/w) were charged into a mixer and stirred until blended, approximately 5 minutes. This SBR latex pretreatment had 25% solids.

EXAMPLE 2

SBR Latex Pretreatment

Using the process of Example 1 a SBR latex pretreatment was prepared except that the Butonal NS 175 ® SBR latex and water each were added at 50% w/w to yield a pretreatment composition having 35% solids.

EXAMPLE 3

SBR Latex Pretreatment

Using the process of Example 1 an SBR latex pretreatment was prepared from Butonal NS 175 ® SBR latex (18.1% w/w), Aquatac-6025 ® Arizona Chemical Co. (20.8% w/w), a hydrocarbon resin emulsion tackifying agent, and water (61.1% w/w). This pretreatment composition had 25% total solids.

EXAMPLE 4

SBR Latex Pretreatment

Using the process of Example 1 an SBR latex pretreatment was prepared from Butonal NS 175 ® SBR latex (18.1% w/w), Aquatac-6025 ® (20.8% w/w), a rosin ester resin emulsion tackifying agent, and water (61.1% w/w). This pretreatment composition had 25% total solids.

EXAMPLE 5

SBR Latex Pretreatment

Using the process of Example 1 an SBR latex pretreatment was prepared from Butonal NS 175 ® latex (27.2% w/w), Aquatac 6085 (10.4% w/w), a rosin ester resin emulsion tackifying agent, and water (62.2% w/w). This pretreatment composition had 25% total solids.

EXAMPLE 6

SBR Latex Pretreatment

An SBR latex pretreatment was prepared as in Example 5 except that Aquatac 6025 ® (10.4% w/w), a hydrocarbon resin emulsion tackifying agent was used and yielded a pretreatment composition containing 25% solids.

EXAMPLE 7

SBR Latex Pretreatment

A waterproofing agent pretreatment composition was prepared according to the Example 1 procedure using Butonal NS 198 ® (BASF), an SBR latex including styrene:butadiene polymer having a styrene:butadiene ratio of 24:76 and a fatty acid as a surfactant. This SBR latex (39.7% w/w) and water (60.3% w/w) were mixed to yield a pretreatment composition having 25% solids.

EXAMPLE 8

SBR Latex Pretreatment

Using the process of Example 7 a SBR latex pretreatment was prepared except that the Butonal NS 198 ® SBR latex and water each were added at 50% w/w to yield a pretreatment composition having 32% solids.

EXAMPLE 9

SBR Latex Pretreatment

Using the process of Example 1 an SBR latex pretreatment composition was prepared from Butonal NS 125 ® (BASF), an SBR latex including a styrene:butadiene polymer having a styrene:butadiene ratio of 31:69 and a fatty acid as a surfactant. This SBR latex (35.4% w/w), water (65.6% w/w), and ethylene glycol (2.5% w/w) were mixed to yield a pretreatment composition containing 25% solids.

EXAMPLE 10

SBR Latex Pretreatment

Using the process of Example 1 an SBR latex pretreatment was prepared using Butonal NS 131 ® (BASF) an SBR latex including a styrene:butadiene polymer having a styrene:butadiene ratio of 35:65 and a fatty acid as a surfactant. This SBR latex (35.7% w/w), water (64.2% w/w) and ethylene glycol (2.5% w/w) were mixed to yield a pretreatment composition having 25% solids.

EXAMPLE 11

SBR Latex Pretreatment

Using the process of Example 1 an SBR latex pretreatment was prepared from Pliolite LPF 6733 ® (Goodyear Tire and Rubber Co.) an SBR latex including a styrene:butadiene polymer having a styrene:butadiene ratio of 34:66 and a mixed acid surfactant. This SBR latex (36.2% w/w), water (63.8% w/w), and ethylene glycol (2.5% w/w) were mixed to yield a pretreatment composition having 25% solids.

EXAMPLE 12

SBR Latex Pretreatment

Using the process of Example 1 an SBR latex pretreatment was prepared from Pliolite LPF 6738 ® (Goodyear Tire & Rubber Co.) an SBR latex including a styrene:butadiene polymer having a styrene:butadiene ratio of 29:71 and a mixed acid surfactant. This SBR latex (36.2% w/w), water (63.8% w/w), and ethylene glycol (2.5% w/w) were mixed to yield a pretreatment composition having 25% solids.

EXAMPLE 13

SBR Latex Pretreatment

Using the process of Example 1 an SBR latex pretreatment was prepared from Pliolite LPF 5356, an SBR latex including a styrene:butadiene polymer having a styrene:butadiene ratio of 23.5:76.5 and a fatty acid surfactant. This SBR latex (36.2% w/w), water (63.8% w/w), and ethylene glycol (2.5% w/w) were mixed to yield a pretreatment composition having 25% solids.

EXAMPLE 14

SBR Latex Pretreatment

Using the process of Example 1 an SBR latex pretreatment was prepared except that the Butonal NS 175 ® SBR latex was added at 10% w/w and the pretreatment composition also contained 10% solids of asphalt emulsion (SS-1H, designating a slow setting grade with a residue penetration of 40-90 dmm, a hard grade) and 0.15% Carbopol 934 ® (B. F. Goodrich) polyacrylic acid thickener. This pretreatment composition had 20% solids.

EXAMPLE 15

Natural Rubber Latex Pretreatment

A waterproofing agent pretreatment composition was prepared from Hartex 103 ® (Firestone Tire and Rubber Company) a natural rubber latex having the following chemical and/or physical characteristics: 62% solids, KOH number=0.55, and pH=9.8. This natural rubber latex (50.0% w/w) and water (50.0% w/w) were charged into a mixer and stirred until blended, approximately 5 minutes. This natural rubber pretreatment had 31% solids.

EXAMPLE 16

Polybutadiene Latex Pretreatment

A waterproofing agent pretreatment composition was prepared from LPM 2374 ® (Goodyear Tire and Rubber Co.) a polybutadiene latex. This polybutadiene latex (41.7% w/w) and water (58.3% w/w) were charged into a mixer and stirred into a blended composition for approximately 5 minutes. This polybutadiene latex pretreatment had 25% solids.

EXAMPLE 17

SBS Latex Pretreatment

A waterproofing agent pretreatment composition was prepared from Kraton G 1657 ® (Shell Oil Company), an SBS block copolymer having a styrene:butadiene ratio of 30:70 and a rosin ester. The pretreatment composition was prepared by emulsifying the SBS block copolymer and rosin ester in water with an ionic surfactant in amounts yielding a total solids content of 43%.

EXAMPLE 18

Slow Peel Testing

The following procedure was used for slow peel testing. The waterproofing laminate used in this testing has a rubberized asphalt layer including asphalt, thermoplastic block polymers of styrene and butadiene, and process oil and a support film of crosslaminated polyethylene. The control pretreatment is a commercially available composition containing about 12% styrene:butadiene block copolymer and 12% Nevchem-140 ® (alkylated aromatic nonsaponifiable petroleum hydrocarbon resin with a softening point of about 140° C.) in xylene.

According to the test procedure a concrete block initially is sprayed with a pretreatment composition at a target coverage range of 400-500 sq. ft. per gallon. Then the pretreatment composition is allowed to dry for approximately about 2 hours, and a 3" by 6" sample of waterproofing laminate is applied and quickly rolled 4 times with a 30-pound roller. Next, a 100 g weight is attached to a tab along one of the short sides of the waterproofing laminate and the waterproofing laminate is placed in a vertical position with the weighted side elevated. Waterproofing laminate displacement as a function of time is monitored.

Table I shows test results of the latex pretreatment compositions of the previous examples. Also tested as described in this example, but not shown in the table, were several pretreatment compositions in which the latex was carboxylated SBR latex or an acrylic latex.

All of the carboxylated SBR latex pretreatment compositions and acrylic pretreatment compositions had greater than 6 inches movement after 5 days.

TABLE 1

| Pretreatment Composition | Displacement (in.) with time (days) | | | | | | | | | |
|---|---|---|---|---|---|---|---|---|---|---|
| | 1 | 2 | 3 | 5 | 6 | 8 | 9 | 10 | 12 | 16 |
| Control | | 1.1 | 1.1 | | 1.3 | | | 1.8 | | 1.8 |
| Example 1 | 0 | | | | .12 | | | .9 | | |
| Example 2 | .05 | | | .05 | .1 | .1 | | | | |
| Example 3 | .06 | .31 | | .5 | | | .62 | 1.4 | | |
| Example 4 | 0 | .19 | .31 | | | | .31 | .56 | | |
| Example 5 | 0 | .12 | .25 | | | | .25 | .38 | | |
| Example 6 | 0 | .12 | .25 | | | | .25 | .38 | | |
| Example 7 | .06 | .06 | | .125 | | | .25 | .25 | | |
| Example 8 | .15 | | | | .5 | | | | | |
| Example 9 | .06 | .06 | .25 | .25 | | | | .37 | | .44 |
| Example 10 | .03 | .06 | .16 | .16 | | | | .25 | | .25 |
| Example 11 | .25 | .25 | .37 | .37 | | | | .94 | | 1.3 |
| Example 12 | .12 | .25 | .25 | .44 | | | | .75 | | 1.5 |
| Example 13 | .19 | .19 | .37 | .44 | | | | .81 | | 1.4 |
| Example 14 | .03 | .06 | | | | 1.0* | | 1.75 | | 6** |
| Example 15 | 0 | 0 | | | 6+ | | | | | |
| Example 16 | | 0 | | .09 | | | 1.15 | | 1.3 | |
| Example 17 | .5 | .56 | | | 2.0 | | | | 6+ | |

*7-day data
**18-day data

EXAMPLE 19

Water Immersion Testing

Samples for testing were prepared by spraying a concrete block with a pretreatment at a target coverage range at about 400-500 sq. ft./gallon. Then the pretreatment was allowed to dry for 2 hours and a 3" by 6" sample of waterproofing laminate, as used in Example 17, was applied and rolled four times with a 30-pound roller. The samples were maintained for 1 day dry and then immersed in water for 28 days. Thereafter, adhesion was measured using an Instron ® mechanical tester (tensile testing machine) using a peeloff angle of 90° and a crosshead speed of 2" per minute. The data obtained is shown in TABLE II in which the control is the same as in Example 17.

TABLE II

| Pretreatment Composition | Bond Strength lb/in |
|---|---|
| Control | 5.0 |
| Example 1 | 4.8 |
| Example 9 | 5.5 |
| Example 10 | 4.5 |
| Example 11 | 4.6 |
| Example 12 | 5.4 |
| Example 13 | 4.8 |
| Example 14 | 2.8 |

EXAMPLE 20

Low Temperature Initial Adhesion

Prior to sample preparation all materials are equilibrated at 40° F. Then, in a 40° F. environment a concrete block is sprayed with a pretreatment composition at a target coverage range of about 400-500 sq. ft./gallon and is allowed to dry for about 2 hours. Then, while continuing to work in a 40° F. environment a 3"×6" sample of waterproofing laminate, as used in Example 17, is applied to the concrete block and quickly rolled with a 30-pound roller. After maintaining the sample for one day at 40° F. adhesion is measured using an Instron ® mechanical tester (tensile measuring instrument) using a peeloff angle of 90° and a crosshead speed of 2"/minute. Test data is shown in Table III in which the control is the same as in Example 17.

TABLE III

| Pretreatment Composition | Bond Strength lb/in |
|---|---|
| Control | 1.7 |
| Example 1 | 2.4 |
| Example 9 | 2.1 |
| Example 10 | 2.4 |
| Example 11 | 3.2 |
| Example 12 | 1.8 |
| Example 13 | 1.4 |

We claim:

1. A pretreated, waterproofed package, comprising:
   a water-penetrable surface contiguous to a building structure;
   a layer disposed over said surface comprising an aqueous waterproofing agent pretreatment composition including SBR latex, SBS latex, natural rubber latex, polybutadiene latex, polychloroprene latex, or a combination thereof; and
   a waterproofing laminate disposed over said pretreatment composition layer, said laminate comprising at least one support layer and at least one waterproofing adhesive layer.

2. The package of claim 1 wherein said waterproofing laminate comprises at least one polymeric layer and at least one bituminous adhesive layer.

3. A package of claim 2 wherein the waterproofing laminate has a bituminous layer including about 29-54% by weight asphalt, about 25-50% by weight process oil, and about 10-35% by weight of a thermoplastic block polymer of styrene and butadiene monomers or random styrene and butadiene rubber polymer.

4. A package of claim 2 wherein the waterproofing agent pretreatment includes asphalt emulsions in amounts of about 5 to about 20%.

5. A package of claim 2 wherein the SBR latex includes styrene:butadiene polymers having styrene:butadiene ratios between about 1:99 and about 60:40 or the SBS latex includes styrene:butadiene:styrene polymers having molecular weights between about 50,000 to 500,000 and styrene:butadiene ratios from about 10:90 to 40:60.

6. A package of claim 5 wherein the styrene:butadiene polymer has a styrene:butadiene ratio of about 20:80 to about 40:60.

7. A structure having a water-penetrable surface to which has been applied an aqueous waterproofing agent pretreatment including SBR latex, SBS latex, natural rubber latex, polybutadiene latex, polychloroprene latex, or a combination thereof which pretreatment composition includes from 1% to 70% by weight solids and contains less than about 20% asphalt and is effective to produce bonds between the structure and subsequently applied waterproofing agents which are sufficiently strong and enduring to secure the waterproofing agent to the structure essentially for the life of the structure.

8. A structure of claim 7 wherein the waterproofing agent pretreatment includes asphalt emulsions in amounts of about 5 to about 20%.

9. A structure of claim 7 wherein the SBR latex includes styrene:butadiene polymers having styrene:butadiene ratios between about 1:99 and about 60:40 or the SBS latex includes styrene:butadiene:styrene polymers having molecular weights between about 50,000 to 500,000 and styrene:butadiene ratios of from about 10:9240:60.

10. A structure of claim 9 wherein the styrene:butadiene polymer has a styrene:butadiene ratio of about 20:80 to about 40:60.

11. A method for waterproofing pretreatment of a surface of a building, bridge, road, tunnel, subterranean basement or other water-penetrable building structures, comprising the steps of:
providing a water-penetrable surface of a building structure;
providing a composition comprising an element selected from the group consisting of SBR latex, SBS latex, natural rubber latex, polybutadiene latex, and polychloroprene latex, said composition including from 1% to 70% by weight solids and contains less than about 20% asphalt and is effective to produce bonds between the structure and subsequently applied waterproofing agent which are sufficiently strong and enduring to secure the waterproofing agent to the structure essentially for the life of the;
pretreating said water-penetrable building structure surface by applying said composition thereto; and
applying a preformed, sheet-like waterproofing laminate comprising at least one support layer and an adhesive waterproofing layer over said pretreated surface.

12. The method of claim 11 wherein said sheet-like waterproofing laminate comprises at least one polymeric layer and at least one bituminous adhesive layer.

13. A method of claim 11 wherein the waterproofing agent pretreatment includes asphalt emulsions in amounts of about 5 to about 20%.

14. A method of claim 1 wherein the SBR latex includes styrene:butadiene polymers having styrene:butadiene ratios between about 1:99 and about 60:40 or the SBS latex includes styrene:butadiene:styrene polymers having molecular weights between about 50,000 to 500,000 and styrene:butadiene ratios of from about 10:90 to 40:60.

15. A method of claim 14 wherein the styrene:butadiene polymer has a styrene:butadiene ratio of about 20:80 to about 40:60.

16. A method of claim 12 wherein the waterproofing laminate has a bituminous layer including about 29-54% by weight asphalt, about 25-55% by weight process oil, and about 10-35% by weight of a thermoplastic block polymer of styrene and butadiene monomers or random styrene and butadiene rubber polymer.

17. A method of claim 16 wherein the waterproofing laminate bituminous layer includes 1 to 50% filler based on weight of all bituminous layer components.

18. A method of claim 16 wherein the bituminous layer includes 16-35% by weight thermoplastic block polymer of styrene and butadiene monomers or random styrene and butadiene rubber polymer.

19. A method of claim 16 wherein the asphalt has the following alumina separation (ASTM D-4124) ranges:

| Saturates | 5-25% |
|---|---|
| Naphthenic Aromatics | 15-40% |
| Polar Aromatics | 30-50% |
| Asphaltenes | 5-30% | or the process oil has the following clay gel separation (ASTM D-2007) ranges:

| Saturates | 10-30% |
|---|---|
| Polar Compounds | 10-20% |
| Aromatics | 50-85% |
| Asphaltenes | 0-0.5% |

20. A method of claim 19 wherein the asphalt has the following alumina separation (ASTM D-4124) range:

| Saturates | 8-15% |
|---|---|
| Naphthenic Aromatics | 32-40% |
| Polar Aromatics | 40-46% |
| Asphaltenes | 8-15% |

21. A method of claim 20 wherein the thermoplastic block polymer of styrene and butadiene monomers are mixtures of polymers having a butadiene:styrene ratio of about 70:30 and a block polystyrene content of about 30% and polymers having a butadiene:styrene content of about 75:25 and a block polystyrene content of about 18%.

* * * * *